United States Patent
Ward et al.

(10) Patent No.: US 7,975,522 B2
(45) Date of Patent: Jul. 12, 2011

(54) FASTENER MANUFACTURING ASSEMBLY AND METHOD

(75) Inventors: Richard P. Ward, Canton, MI (US); Jorge E. Gonzalez, Canton, MI (US); Richard Gregory Bahlow, Ann Arbor, MI (US)

(73) Assignee: Whitesell International Corporation, Taylor, MI (US)

( * ) Notice: Subject to any disclaimer, the term of this patent is extended or adjusted under 35 U.S.C. 154(b) by 527 days.

(21) Appl. No.: 12/040,433

(22) Filed: Feb. 29, 2008

(65) Prior Publication Data

US 2008/0201934 A1 Aug. 28, 2008

Related U.S. Application Data

(63) Continuation-in-part of application No. 11/122,629, filed on May 5, 2005, now Pat. No. 7,367,893.

(51) Int. Cl.
*B21J 11/00* (2006.01)
*B21D 53/24* (2006.01)

(52) U.S. Cl. ......... 72/405.01; 470/25; 470/96; 470/109; 470/165; 470/167; 470/98

(58) Field of Classification Search ................ 72/10, 18, 72/25, 96, 98, 99, 102, 109, 164, 165, 167, 72/176, 405.01, 405.05; 198/347.4, 890, 198/890.1; 470/10, 18, 25, 96, 98, 99, 102, 470/109, 164, 165, 167, 176; 408/42, 43, 408/49, 50, 62, 64, 69; 29/26 R, 26 A
See application file for complete search history.

(56) References Cited

U.S. PATENT DOCUMENTS

| | | | |
|---|---|---|---|
| 1,832,167 A | | 11/1931 | Wilcox |
| 1,957,952 A | | 5/1934 | Gibney |
| 2,022,076 A | | 11/1935 | Costin et al. |
| 2,356,087 A | * | 8/1944 | Prokul ............... 470/105 |
| 3,179,966 A | * | 4/1965 | Adams ............... 408/43 |
| 3,711,931 A | | 1/1973 | Ladouceur et al. |
| 3,748,674 A | | 7/1973 | Powell et al. |
| 3,775,791 A | | 12/1973 | Grube |
| 3,845,860 A | | 11/1974 | Ladouceur et al. |
| 4,306,654 A | | 12/1981 | Grube |
| 4,315,688 A | | 2/1982 | Pryor |
| 4,473,330 A | * | 9/1984 | Chalier ............... 408/98 |
| 4,679,690 A | | 7/1987 | Steward et al. |

(Continued)

OTHER PUBLICATIONS

PCT/US05/15680 International Search Report dated Oct. 24, 2005.

*Primary Examiner* — Edward Tolan
(74) *Attorney, Agent, or Firm* — Dierker & Associates, P.C.

(57) ABSTRACT

The present invention is an assembly and method for continuously manufacturing fasteners. A die press actuated at a first speed receives the contoured wire into a die having a piercing element for piercing an aperture and a cutting element for cutting a fastener from the wire. A guide receives the fasteners from the die press and a drive unit engages the fasteners oriented by the guide and conveys the fastener to an elevated height relative to a tapping device. The guide redirects the fasteners by a first router. The fasteners are gravity fed into the first router and redirected to one of the tapping devices. Each tapping device has a tapping element for forming internal ribs in the aperture of the fastener. The tapping devices each actuates at a second speed that in aggregate is generally equal to the first speed of the die press.

18 Claims, 5 Drawing Sheets

U.S. PATENT DOCUMENTS

| | | | |
|---|---|---|---|
| 4,706,369 A * | 11/1987 | Lavorel | 29/560 |
| 4,971,499 A | 11/1990 | Ladouceur | |
| 5,016,461 A | 5/1991 | Walker et al. | |
| 5,299,351 A * | 4/1994 | Takahashi et al. | 29/798 |
| 5,348,429 A | 9/1994 | Pfister | |
| 5,383,021 A | 1/1995 | Hanna | |
| 7,367,893 B2 * | 5/2008 | Vrana et al. | 470/25 |
| 2005/0013679 A1 | 1/2005 | Ladoucer et al. | |
| 2006/0252561 A1 | 11/2006 | Vrana et al. | |

* cited by examiner

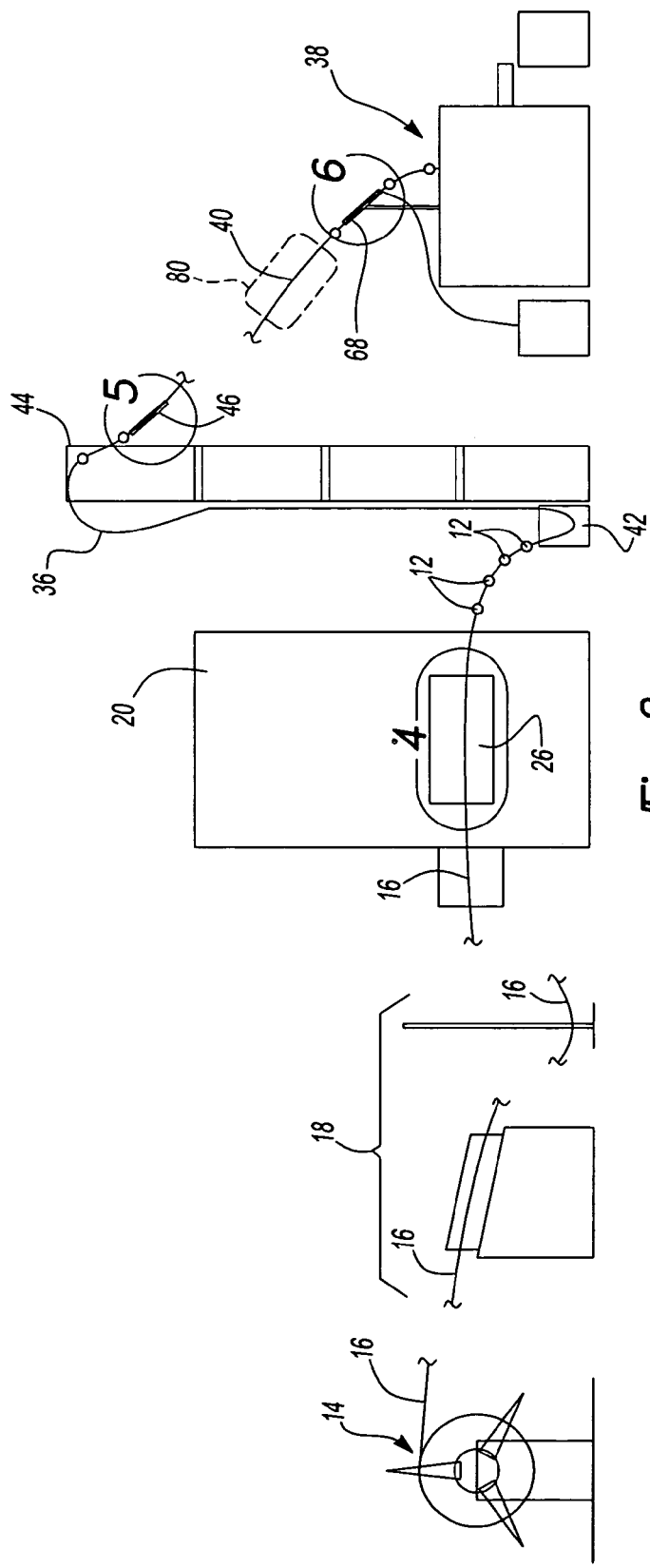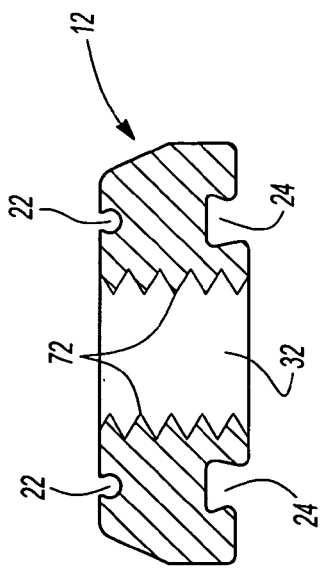

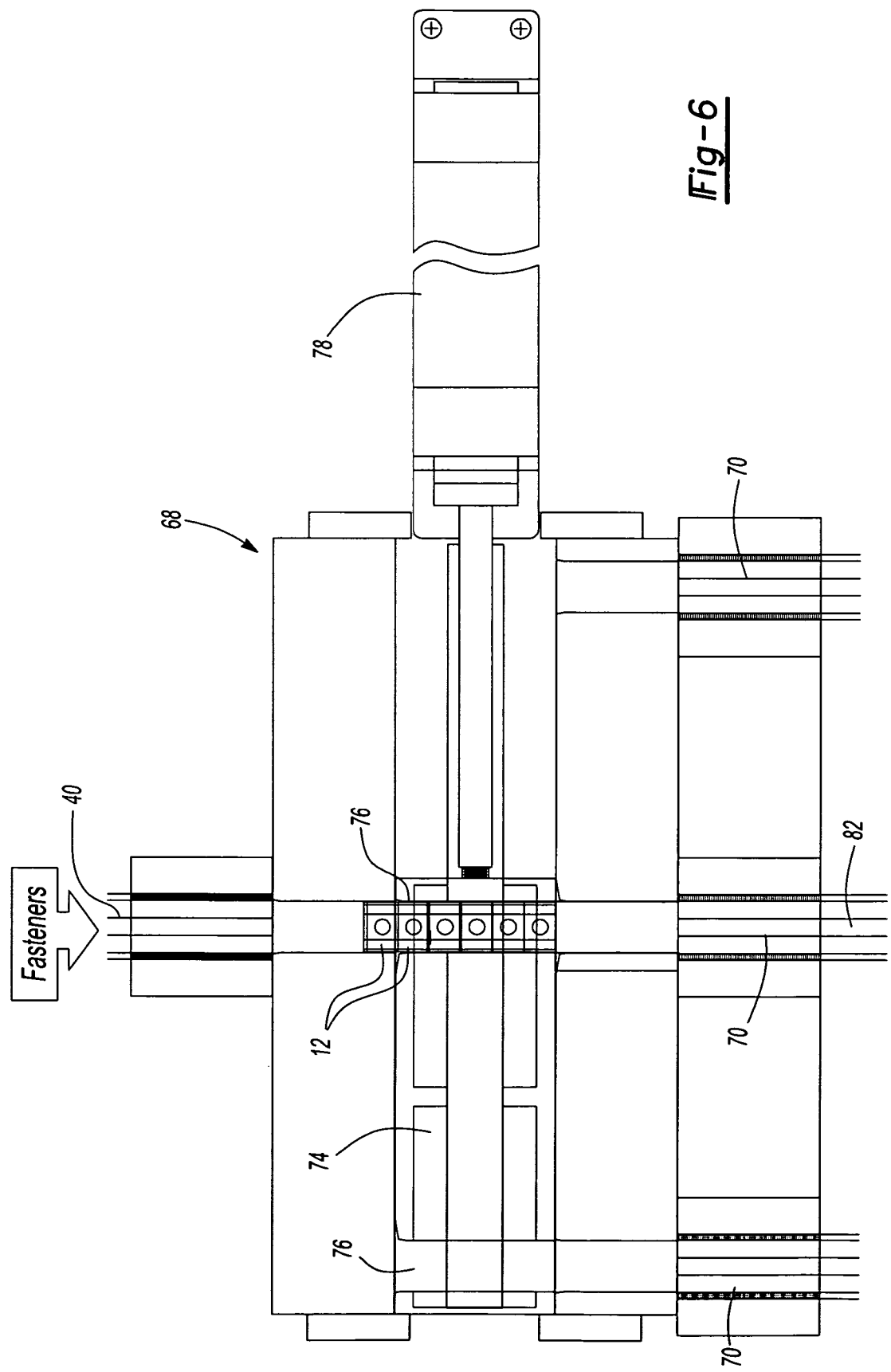

FASTENER MANUFACTURING ASSEMBLY AND METHOD

CROSS REFERENCE TO RELATED APPLICATION

This application is a continuation-in-part application of U.S. Ser. No. 11/122,629 now U.S. Pat. No. 7,367,893 filed May 5, 2005 and is incorporate by reference herewith in its entirety.

FIELD OF THE INVENTION

The present invention is generally related toward an approved method and apparatus of manufacturing fasteners. More specifically, the present invention is related toward a method and apparatus of manufacturing fasteners in a continuous manner producing a strip of fasteners, which may be rolled into a coil for use at an installation site.

BACKGROUND OF THE INVENTION

Various methods of manufacturing fasteners, such as, for example, pierce nuts and the like have been used in the past and have provided satisfactory results enabling production of these types of fasteners in high volumes. End users of these pierce nuts have preferred using a continuous strip of pierce nuts connected side to side with a wire such as is disclosed in U.S. Pat. No. 3,845,860, for Fastener Strip.

The installation of the pierce nuts is greatly simplified when provided to an end user in a continuous strip wound in a coil, which eliminates the need for expensive bowl mixers and alignment devices used to align these fasteners prior to production installation into a panel. A common process for providing coils of nuts attached in a strip, such as described above, includes a combination of batch and in-line process which is presently utilized.

For example, a coil of steel rod is provided to a nut manufacturing facility, and is preferably, formed to provide a cross-sectional geometric shape necessary to pierce, and/or clinch, sheet metal, and to provide a groove to receive the wire in a manner set forth above. This rod is processed through a die that both cuts individual pierce nuts and pierces an aperture through the rod forming an inner annular surface in each individual fastener. Once the individual fastener blanks have been separated, the blanks are moved to a tapping machine to provide a helical rib around the inner annular wall of the pierced aperture of each pierce fastener. These fasteners are subsequently placed into a bulk bowl feeder that aligns a plurality of the fasteners in an orientation necessary for continued processing. Various problems are associated with the above-mentioned process. For example, during the cutting stage of the die press, various grooves, and more specifically, the groove designated to receive the attachment wire is known to be deformed making it difficult to insert the wire into the wire groove in a uniform manner. Furthermore, defects associated with location and dimension of the nut apertures and vehicle groove have not yet been identified.

Once the nuts have been oriented in a uniform fashion, the nuts are transferred via a track to a wire insertion and knurling operation to attach the nuts in a continuous strip. A second press or an equivalent roller inserts the wire into the aligned wire groove of each nut and a knurling machine deforms the nut over the wire for retaining the wire in the aligned groove thereby forming the continuous strip of fasteners. Subsequently, the fasteners are rolled in a coil for shipment and for use at a production facility that installs pierce fasteners as is known to those of skill in the art.

A further problem associated with the prior art method is realized when an error occurs during the tapping or piercing process resulting in the defective formation of the aperture or helical rib disposed upon the inner surface of the aperture. Once the fasteners have been attached in a strip, it is impossible to replace a defective fastener without breaking the continuous strip resulting in a partial coil of fasteners that is undesirable to the end user. Therefore, a nearly full coil of fasteners is frequently viewed by the end user as being undesirable when a single defective fastener is discovered after the fasteners have been attached in a continuous strip. Furthermore, the smaller strip of fasteners that are separated from the nearly full coil of fasteners is generally scrapped.

A still further problem exists with the present state of the art relating back processing that reduces the throughput of fasteners through the manufacturing process. It is known to those of skill in the art that orienting nuts in a bowl feeder is a bottleneck in the manufacturing process that reduces the rate at which fasteners are manufactured resulting in a more expensive fastener. It would be desirable to eliminate the bowl feeder from the manufacturing process. Furthermore, it would be desirable to provide a continuous manufacturing process that solves the problems associated with the prior art method of manufacturing by eliminating defective nuts found in a continuous strip, eliminate the batch process of manufacturing, and providing a consistent, continuous groove formed by adjacent nuts in a strip.

SUMMARY OF THE INVENTION AND ADVANTAGES

The present invention is an assembly line for continuously manufacturing fasteners from a wire source of contoured wire. The assembly includes a die and die press actuated at a first speed. The die press receives the wire from the wire source is directed into the die. The die has a piercing element for piercing an aperture seriatim in the contoured wire and a cutting element for cutting a fastener from the wire between the apertures. A guide receives the fastener from the die press and maintains the fastener in a consistent orientation. A drive unit engages the fastener oriented by the guide thereby conveys the fastener along the guide. The guide redirects the fasteners into one of at least two alternate paths. Each of the alternate paths directs the fastener to a tapping device. The tapping device has a tapping element for providing internal ribs to an inner wall of the aperture formed in the fastener by the piercing element. The tapping devices actuating at a second speed in aggregate generally equal to the first speed of the die press.

Another aspect of the invention includes a method for continuously manufacturing nuts having a wire source of contoured wire the method comprising the steps of receiving the contoured wire from the wire source into the die press. Piecing an aperture into the wire seriatim by the piercing element of the die and cutting the fastener from the wire between the apertures by the cutting element of the die at the first speed. A guide redirects the fasteners from the die press in a consistent orientation to one of the plurality of tapping devices. Forming an internal rib to an inner wall by the tapping element in the aperture pierced into the fastener by the piercing element at the second speed in aggregate of the plurality of tapping devices.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is a side view schematic of the assembly line;

FIG. 3 is a cross-sectional view of a fastener;

FIG. 6 is top view schematic of a second router for directing the fasteners to one of a fastener routes of each tapping device.

DETAILED DESCRIPTION OF THE INVENTION

Figure 1:
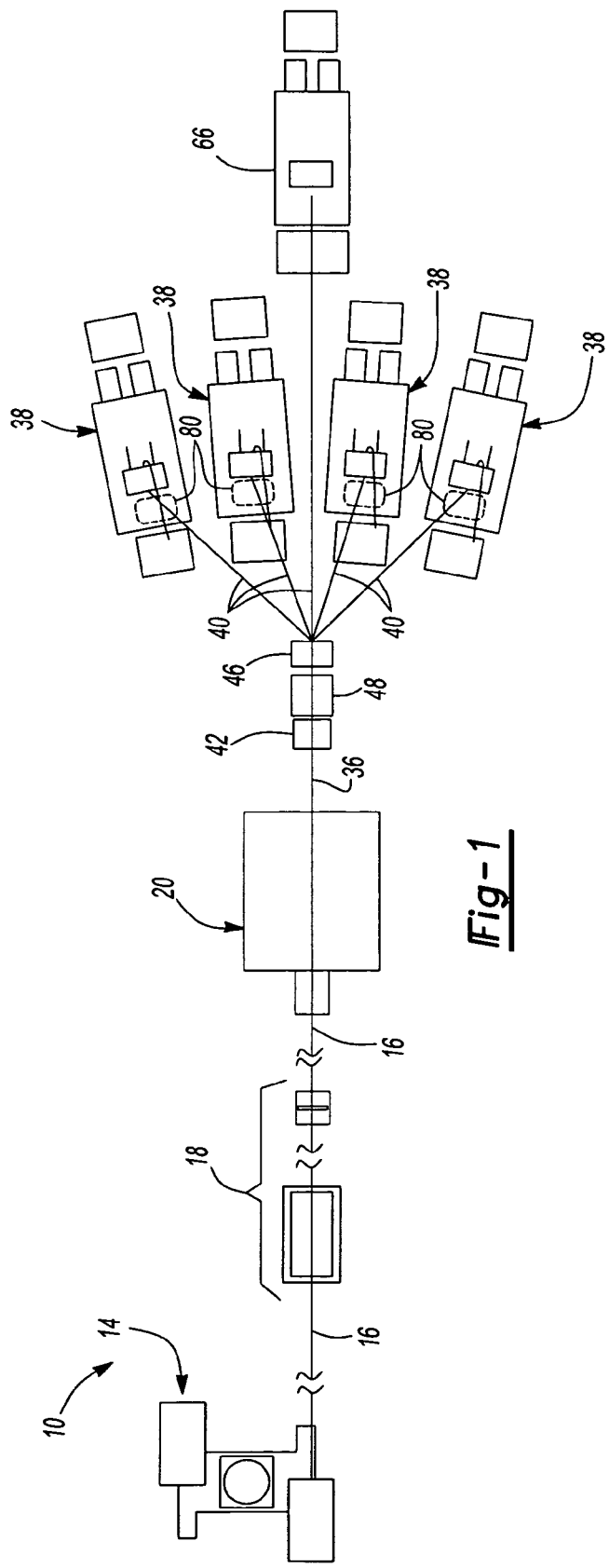
FIG. 1 is top view schematic of an assembly line for continuously making a fastener.

Referring to the FIGS. 1 and 2, an illustrated embodiment of the inventive assembly for manufacturing fasteners is generally shown at 10. The assembly provides for manufacturing a fastener 12 from a continuous wire source 14 of contoured wire 16. The wire source 14 is preferably a coil of contoured wire 16 that is advanced through a straightening device 18, as is known in the art. The contoured wire 16 is received into a die press 20 for manufacturing of fasteners 12, such as a pierce nut.

The contoured wire 16 is preferably a pre-formed wire having at least one wire groove 22 opposing a re-entrant groove 24. The cross-section of the fastener 12 in FIG. 3 best illustrates the profile of the contoured wire 16. In the illustrated embodiment the contoured wire 16 includes two wire grooves 22 and two re-entrant grooves 24.

Figure 4:
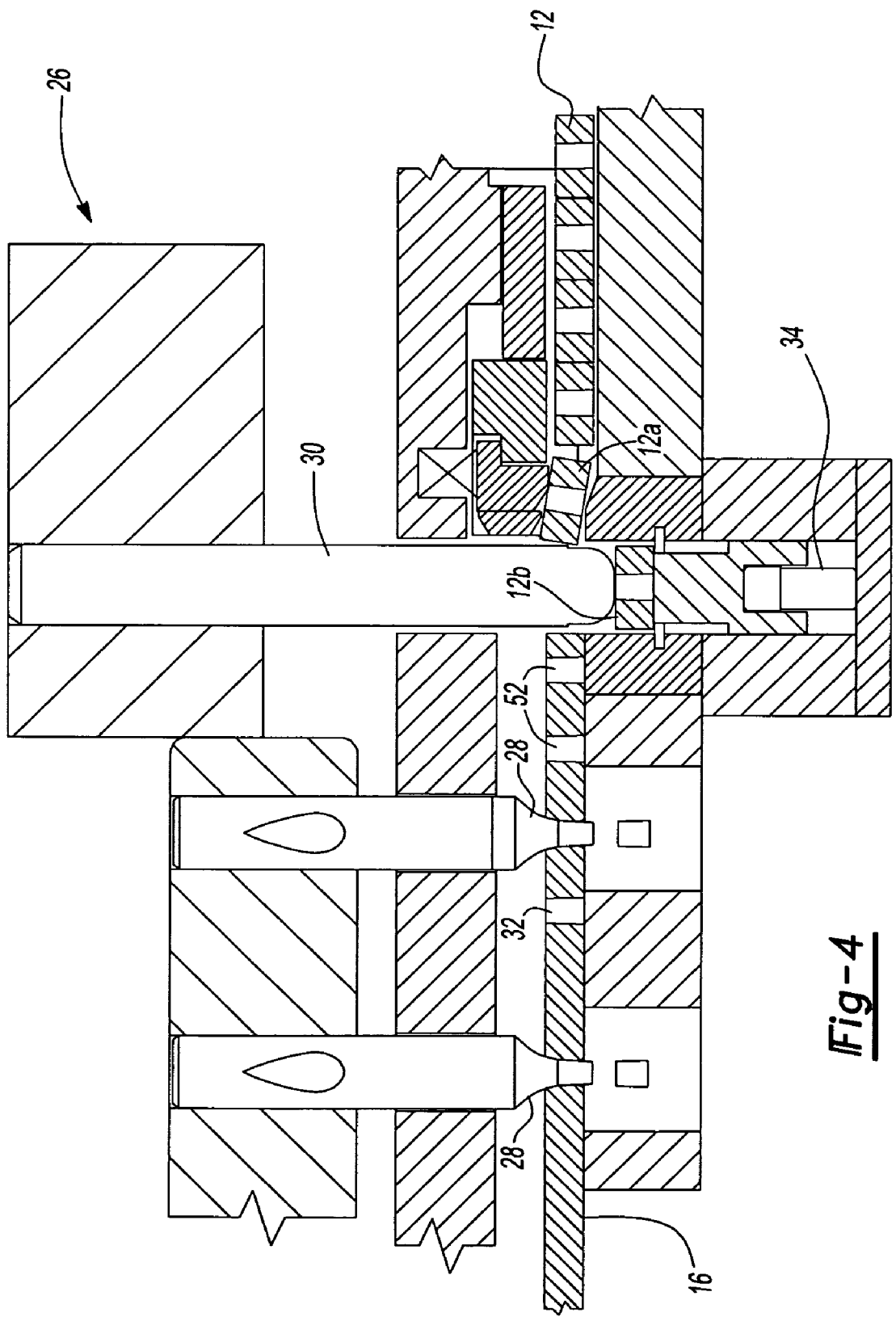
FIG. 4 is a partial cross-section of a die press configured to produce two fasteners with each actuation of a die.

The die press 20 advances the contoured wire 16 from the straightening device 18 into a die 26. As shown in FIG. 4, the die 26 includes a piercing element 28 and a cutting element 30. The piercing element 28 pierces an aperture 32 into the contoured wire 16 seriatim with each actuation of the die 26 by the die press 20. The die 26 further includes a cutting element 30 that cuts each fastener between the apertures 32 from the contoured wire 20. In the illustrated embodiment, the die 26 is configured to produce two fasteners 18 with each actuation of the die press 20. The die 26 includes two piercing elements 28 and the contoured wire 16 is advanced the width of two fasteners 12 with each actuation. The cutting element 30 separates a forward fastener 12a from the contoured wire 16, simultaneously, as the cutting element 30 also drives a rearward fastener 12b downward from the contoured wire. The die 26 includes a biasing member 34 under the rearward fastener 12b. The biasing member 34 allows the cutting element 30 to drive the rearward fastener 12b below the path of the contoured wire 16 and as the cutting element 30 actuates upward the biasing member 34 biases the rearward fastener 12b back to the same plane as the forward fastener 12a. The die press 20 advances the received contoured wire 16 and the forward and rearward fasteners 12a, 12b are advanced out of the die press into a guide 36. The biasing member 34 could be numerous biasing members known in the art, such as a spring or pneumatic cylinder filled with various mediums. In the illustrated embodiment, a nitrogen cylinder is utilized to provide a greater biasing force and quick rebound time to facilitate the high speed actuation of the die 26 and die press 20.

The die 26 and die press 20 are actuated at a first speed, which could be as much as or greater than 400 actuations per minute. That would mean that with a single piercing and cutting element 28, 30 a single die press 20 would produce 400 fasteners per minute. As shown in FIG. 3, the die 26 is configured to produce two fasteners 12 with each actuation of the die 26 and dies press 20 therefore at the first speed producing 800 fasteners per minute. The rest of the assembly line 10 has to be able to run at that fastener rate or a bottleneck is created in the manufacturing process and the assembly line 10. Typically, one bottle neck has been the tapping, or forming of the internal ribs or threads of the fastener 12, as is known in the art.

Therefore, the assembly line 10 as shown in FIG. 1 includes five tapping devices 38, four of which consistently are running to maintain the production without a bottle neck. The guide 36 re-directs the fasteners 12 to an alternate path 40 in a consistent orientation to one of the tapping devices 38. The tapping devices 38 each run at a second speed that in aggregate is generally equal to the output of the die 26 and die press 20 running at a first speed. For example, a die press 26 actuating at a first speed of 400 strokes per minute with the die 26 configured to produce two fasteners 12 with each actuation produces 800 fasteners per minute. Therefore, the tapping devices 38 actuating at a second speed of 200 fasteners per minute would mean that the assembly line 10 needs four tapping devices 38 running to maintain the output of the die press 20 in the above example. The guide 36 needs to be able to quickly re-direct while maintaining the orientation of the fasteners 12 to supply the four tapping devices 38 with a constant supply of fasteners 12. A fifth tapping device 38 may be added to react to any one tapping device 38 being removed from service for maintenance to repair a breakdown.

Figure 5:
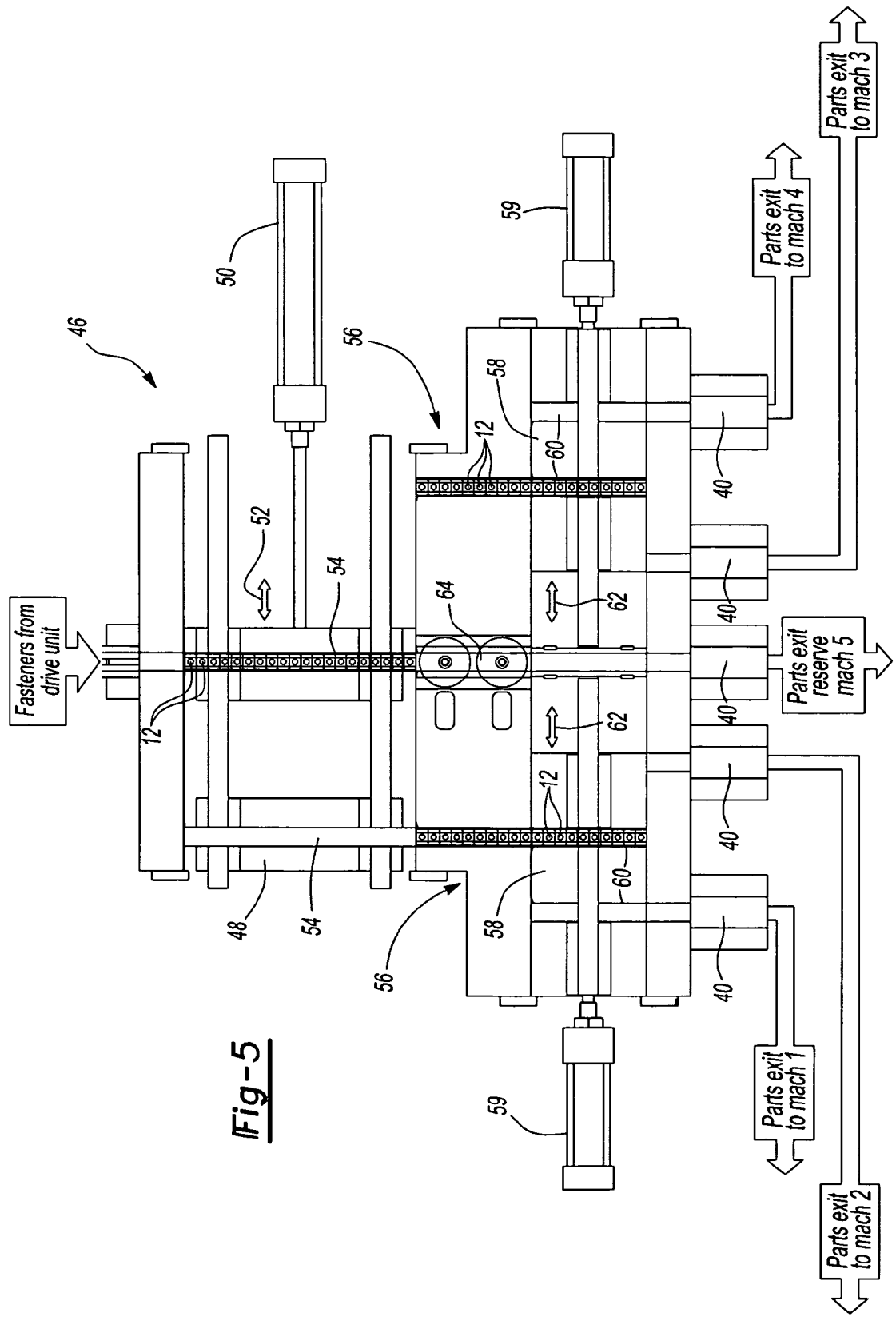
FIG. 5 is a top view schematic of a first router for redirecting the fasteners to an alternate path.

A guide 36 receives the fasteners 12 from the die press 26 as the received contoured wire 16 is advanced through the die 26 pushing the two fasteners 12a, 12b into the guide 36. The guide 36 maintains the fasteners 12 in a consistent orientation as received from the die 26, avoiding the need for vibratory bowls of additional orientation processes in the assembly line 10. A drive unit 42 engages the fasteners 12 in the guide 36 and conveys the fasteners 12 along the guide 36 allowing the guide 36 to re-direct the fasteners 12 into one of the alternate paths 40. In the illustrated embodiment, the drive unit 42 conveys the fasteners 12 through the guide 36 up the height of a tower 44. The tower 44 elevates the fasteners 12 a height above the tapping devices 38 to allow gravity to be driving force of the fasteners 12 through the remaining portion of the guide 36 as the fasteners 12 are redirected to each of the alternate paths 40 and ultimately to the various tapping device 38. As illustrated in FIGS. 2 and 5, the guide 36 includes a first router 46 to redirect the fasteners 12 to one of the four running tapping devices 38. The first router 46 is located a height below the top of the tower 44, as shown in FIG. 2. It has been determined that feeding the first router 46 via gravitational force rather than by way of the drive unit 42 has reduced errors in the process.

Referring to FIG. 5, the first router 46 includes a first carriage 48 slidably actuated by the first router 46, as in the illustrated embodiment by a first piston 50. However, one skilled in the art would understand that there are various actuation methods acceptable to actuate the first carriage 48 in a linear fashion as indicated by a first arrow 52, including servo motors and the like. The first carriage 48 includes at least one collector 54, two collectors 54 are utilized in the illustrated embodiment, for receiving the fasteners 12 from the guide 36 as the drive unit 42 conveys the fasteners 12 over the tower 44 and the fasteners 12 are gravity fed to the first router 46. The first router 46 further includes at least one receptor 56 receiving the fasteners 12 from the collector 54. The receptor 56 includes a second carriage 58 slidably actuated by the first router 46 by a second piston 59. The second carriage 58 defines at least one groove 60 for receiving approximately one-half of the fasteners 12 in the collector 54. In the illustrated embodiment, the second carriage 58 includes two grooves 60 and the second carriage 58 is actuated in a linear fashion as indicated by a second arrow 62. The second carriage 58 divides the fasteners 12 from the collector 54 between two of the alternate routes 40. The first router 46 further includes a reserve track 64 that is selectively operated by the first router 46. The reserve track 64 allows for fasteners 12 to be directed from the collector 54 to a reserve or back-up tapping device 66. The reserve track 64 allows the first router 46 to quickly respond to any break downs by one of the four running tapping devices to avoid a bottleneck in the assembly line 10.

Referring now to FIGS. 2 and 6, each tapping device 38 can further include a second router 68. The second router 68 is located on each tapping device 38 for re-directing the fasteners 12 from one of the alternate paths 40 to one of the at least two fastener routes 70 of the tapping device 38. As illustrated in FIG. 6, the second router 68 includes three fastener routes 70, to direct the fasteners 12 to a tapping element within the tapping device 38 and the third fastener route 70 is defective fastener route 82 for directing a defective fasteners to a reserve tub. The tapping devices 38 have opposing sides, each having at least one tapping element along the fastener route 70. The tapping element forms an internal rib into an internal wall of the aperture 32 formed in the fastener 12 by the piercing element 28 of the die 26.

Referring to FIG. 6, the second router 68 includes a directing carriage 74 having a slot 76 for receiving fasteners 12 from one of the alternate paths 40. The slot 76 receives a number of fasteners 12 and is slidably actuated by a third piston 78 to direct a number of fasteners 12 to one of the fastener routes 70 of the tapping device 38.

Optionally, an inspection station 80 may be utilized in the assembly line 10. The inspection station 80 is disposed along each of the alternate paths before the second router 68 for inspecting each of the fasteners 12 as the fastener 12 slides down the alternate path 40 toward the tapping device 38. The inspection station 80 checks for various manufacturing variables, including the location and existence of the aperture 32 and the diameter of the aperture 32. In addition, the inspection station could further aid in counting and signaling to the first router 46 the number of fasteners 12 in queue at each tapping device 38, and further send a signal if a back up begins to selectively send fasteners 12 down the reserve track 64. The inspection station 80 may send a signal to the second router 68, downstream of the inspection station 80, to notify the second router 68 of a defective fastener. The second router 68, upon receiving the signal from the inspection station 80, selectively directs the defective fastener or a group of fasteners 12 to the defective fastener route 82.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An assembly line for continuously manufacturing fasteners from a source of wire, comprising:
    a die and die press actuating at a first speed receiving the wire from the source, said die having a piercing element for piercing an aperture seriatim and a cutting element for cutting a fastener from the wire between the apertures;
    a guide receiving the fastener from said die press and maintaining the fastener in a consistent orientation;
    a drive unit engaging the fastener oriented by said guide thereby conveying the fastener along said guide and said guide redirecting the fasteners into one of at least two alternate paths;
    each of said alternate paths directing the fastener to a tapping device having a tapping element for providing internal ribs to an inner wall of the aperture formed in the fastener by said piercing element; and
    said tapping devices actuating at a second speed in aggregate generally equal to said first speed of said die press.

2. An assembly as set forth in claim 1 wherein said die is configured to produce two fasteners with each actuation of said die press.

3. An assembly as set forth in claim 1 wherein said guide includes a first router for directing the fastener to one of said at least two alternate paths.

4. An assembly as set forth in claim 3 wherein said first router includes a first carriage slidably actuated by said first router and said first carriage includes at least one collector for receiving the fasteners from said guide.

5. An assembly as set forth in claim 4 wherein said first router includes at least one receptor for receiving the fasteners from said collector, said receptor includes a second carriage slidably actuated by said first router and said second carriages defines at least one groove for receiving approximately half of the fasteners from said collector.

6. An assembly as set forth in claim 4 wherein said first router includes a reserve track for selectively receiving the fasteners from said collector of said first carriage, said reserve track directs the fasteners to one of the alternate paths.

7. An assembly as set forth in claim 1 including at least two fastener routes on said tapping devices and a second router located adjacent each of said tapping devices for re-directing the fasteners from one of the alternate paths to one of said at least two fastener routes of said tapping device.

8. An assembly as set forth in claim 7 wherein said second router includes a directing carriage slidably actuated by said second router and said directing carriage has a slot for receiving a number of the fasteners from said alternate path and slidably actuated to selectively align with one of said fastener routes after receiving the fasteners from said alternate path.

9. An assembly as set forth in claim 8 including an inspection station disposed along said alternate path for inspecting each fastener and signaling to said first router for redirecting the fasteners to one of said alternating paths and signaling to said second router of defective fasteners for redirecting the defective fasteners.

10. A method for continuously manufacturing fastener having a wire source and a die press and a die having a piercing element and a cutting element actuated at a first rate and a guide maintaining orientation and directing the fastener to a first plurality of tapping devices, said method comprising the steps of:
    feeding wire from the wire source into the die press;
    piercing an aperture into the wire seriatim by the piercing element of the die and separating the fastener from the wire between the apertures with the separating element of the die producing fastener blanks at the first rate;
    directing the fasteners from the die press in the guide while maintaining constant orientation and into the first plurality of tapping devices;

forming an internal rib into an inner wall of the aperture with a tapping element of the tapping devices at a second rate; and operating each of the tapping elements whereby the second rate of the tapping elements in aggregate is generally equal to the first rate of the die press.

11. A method as set forth in claim 10 wherein said step of directing the fasteners further includes providing a drive unit to convey the fasteners along the die toward a first router disposed between said drive unit and said plurality of tapping devices for directing the fasteners to one of the tapping devices by at least one alternate route.

12. A method as set forth in claim 11 wherein said step of directing the fasteners includes providing a second router disposed between the first router and each of plurality of tapping devices for selecting one of at least two fastener routes at each of the tapping devices.

13. A method as set forth in claim 12 including the step of inspecting the fasteners for defects and signaling the first router and the second router for sending the fasteners to any one the tapping device.

14. A method as set forth in claim 10 wherein said step of directing is further defined as advancing a plurality of fasteners along the guide into a plurality of tapping devices aligned in parallel.

15. A method as set forth in claim 10 wherein the step of directing is further defined as redirecting a plurality of fasteners along the guide to one of the first of tapping devices and a second of tapping devices when one of the first and second tapping devices requires additional fasteners.

16. An assembly for continuously manufacturing fasteners from a wire source, comprising:

a die and die press actuating at a first speed receiving wire from the wire source, said die having a piercing element for piercing an aperture seriatim and a separating element for separating a blank from the wire between each aperture;

a guide receiving the blanks from said die press and maintaining the fastener in a constant orientation;

a drive unit engaging each blank oriented by said guide thereby conveying each blank along said guide and said guide redirecting the blank into one of at least two alternate paths;

each of said alternate paths directing the blank to a tapping device having a tapping element for providing internal ribs to an inner wall of the aperture formed in the blank by said piercing element;

each of said tapping devices actuating at a second speed in aggregate generally equal to about twice said first speed of said die press; and said guide using gravity to assist feeding blanks to each of said tapping devices.

17. An assembly as set forth in claim 16 wherein said guide includes a first router for directing the blank to one of said at least two alternate paths.

18. An assembly as set forth in claim 17 including at least two fastener routes on said tapping devices and a second router located between each of said tapping devices for re-directing the blank from one of the alternate paths to one of said at least two fastener routes of said tapping device.

* * * * *